Patented June 24, 1941

2,246,963

UNITED STATES PATENT OFFICE 2,246,963

MANUFACTURE OF STYPHNIC ACID

John W. Wilkinson, New Haven, Conn., assignor to Western Cartridge Company, New Haven, Conn., a corporation of Delaware No Drawing. Application April 19, 1940,
Serial No. 330,531

5 Claims. (Cl. 260—622)

This invention relates to the production of trinitroresorcinol, or styphnic acid, and more particularly to a process of nitrating resorcinol wherein the production of impurities or adulterants is controlled to produce a uniform product.

Styphnic acid is prepared by sulphonating the resorcinol and then nitrating the product so produced. Pure styphnic acid is a material very light in color and is obtained if pure sulphuric acid is used in the sulphonation. In commercial operation the product obtained is a dark brown material which is due to the presence of impurities or adulterants. These impurities are probably due to the presence of nitrous and nitric oxides during sulphonation. The presence of such impurities in commercial styphnic acid has long been known.

Until recently the chemical constitution of these impurities was not known nor were the reasons for their presence in styphnic acid known. It was known that such impurities existed and that they produced the brown color of commercial trinitroresorcinol. It was also known that they gave very little depression of the melting point and could not be separated by crystallization. It was also known that they were formed when either a small quantity of spent acid from a previous nitration remained in the nitrating vessel or when fuming nitric acid was used in the first step of the nitration.

In the manufacture of normal lead styphnate a suspension of styphnic acid is treated with a soluble salt or a hydroxide to produce a salt of styphnic acid and this salt of styphnic acid is then treated with lead nitrate, preferably in the presence of acetic acid, to produce normal lead styphnate. In the patent to Franz, Wilkinson and Ehrlich Patent No. 2,150,653 granted March 14, 1939, there is disclosed the production of normal lead styphnate in the form of plate-like crystals. In carrying out this process the dark brown commercial styphnic acid is used and it is first treated with sodium hydroxide to form sodium styphnate which is in turn treated with lead nitrate and glacial acetic acid to form the plate-like crystals.

The nature of the adulterants present in commercial styphnic acid was first described by Franz, Wilkinson and Ehrlich and it was shown that these adulterants are the nitrated products of the reaction between nitrous and nitric oxides and resorcinol. In the preparation of such styphnic acid for use in the process of the Franz, Wilkinson and Ehrlich patent it was found that the product varied slightly from one batch to another. In forming the styphnic acid with the adulterants present it was the practice to employ a quantity of spent acid which was carefully measured into a clean nitrating vessel but even this practice did not result in the production of a uniform product. The variation in the product was more pronounced when fuming nitric acid was used in nitrating regardless of the care taken in the measurements of the reacting materials. In order to obtain the normal lead styphnate of the desired form disclosed in the patent, it was frequently necessary to add either the adulterants in a concentrated form, or if the adulterants were present in too great quantity, to add the pure styphnic acid thereto. As set forth in said patent, these adulterants include the nitro derivatives of resorufin, the nitro derivatives of indo-phenol and the nitro derivatives of resazurin. In order to obtain a uniform styphnic acid for use in the process of said patent, these materials (that is resorufin, indo-phenol and resazurin) were nitrated and added to those batches of styphnic acid which had a low adulterant content. Whether the batch of styphnic acid required an addition of an adulterant or the addition of pure styphnic acid could only be determined by preparing trial batches of normal lead styphnate by the process described in the patent and examining the normal lead styphnate produced. Crystals from the trial batches of normal lead styphnate were examined microscopically for variation in uniformity and deviation from the plate-like crystal described in said patent.

I have found a method of controlling the amount or quantity of adulterants produced in the preparation of styphnic acid whereby a uniform product can be obtained at all times and the product so obtained used in the production of the normal lead styphnate of said Franz, Wilkinson and Ehrlich patent without the necessity of the trial and error method of testing outlined above. To accomplish this the nitrating vessel must be clean and all traces of spent acid and trinitroresorcinol must be removed after the preparation of each batch. In carrying out the process of my invention resorcinol is first sulphonated but to obtain the production of the desired amount of the adulterants I add a nitrite, such as sodium nitrite, in accurately weighed and predetermined quantity to the sulphuric acid. After the sulphuric acid and the resorcinol have reacted under controlled conditions, nitric acid is then added to the batch and the nitration completed. The quantity of nitrite to be added may be determined experimentally and varies in direct proportion to the other materials used in the nitration. While the quantity may vary according to the amount of adulterants desired in the styphnic acid, I have found that the use of between 2% and 3%, based on the weight of the resorcinol to be nitrated, produces styphnic acid particularly useful in forming the normal lead styphnate of said patent.

While I preferably employ sodium nitrite in practicing the process of the present invention, other nitrites may be employed. I may use potassium nitrite or other alkali metal nitrites. Other inorganic nitrites which form soluble sulphates may be employed, but the alkaline earth nitrites, such as barium and calcium nitrites which form insoluble sulphates, are not as satisfactory as sodium nitrite. Organic nitrites, which are hydrolyzed by sulphuric acid, may also be employed. Amyl nitrite may be used.

A typical example of this process is as follows: The nitrating vessel is thoroughly washed. To this vessel, suitably equipped with an agitator and cooling coils, is added 19 gals. of 92% sulphuric acid. The acid is heated to 80° F. and 12 oz. of sodium nitrite is slowly added. Immediately after the sodium nitrite has been added the resorcinol addition must be started. 35 lbs. of resorcinol is added over a period of 1½ hours with water circulating in the jacket at 105° F. At the end of this period the circulating water is heated to 150° F. and run for 1½ hours after the contents of the nitrator have reached 140° F. The contents of the nitrator are then cooled to 85° F. and 43 liters of 70% nitric acid are added at such a rate to keep the contents of the nitrator at 85° F. This usually requires 11 to 12 hours. The contents are then allowed to heat up from the heat of reaction without cooling for a period of 4 to 5 hours. By this time the temperature will be approximately 100° F. Water at 120° F. is then circulated for 2 hours and the batch cooled and emptied from the nitrator. The quantities, temperatures and times may be slightly varied, as will be apparent to those skilled in the nitrating art and the values given in the preceding example are those which I have found to produce the best results.

By preparing styphnic acid in the manner outlined above the previously practiced inaccurate and unscientific method of obtaining the desired amount of adulterants is avoided. The process results in the preparation of material of a uniform quality containing a constant proportion of adulterants. As a result a better control is obtained over the Franz, Wilkinson and Ehrlich method of producing normal lead styphnate in the manner outlined in Patent No. 2,150,653. The present process eliminates the necessity of separate nitration of resorufin, indo-phenol and resazurin to provide quantities of the adulterant for addition to batches of styphnic acid not having a sufficient amount of the adulterant and it also makes it unnecessary to have available pure styphnic acid for addition to batches containing too great quantities of the adulterant.

The product of the present process is a coarse solid which is easily filtered and handled. It is of a uniform reddish-brown color and is particularly suitable for the manufacture of plate-like crystals of normal lead styphnate.

I claim:

1. In the manufacture of trinitroresorcinol by the sulphonation of resorcinol with sulphuric acid and subsequent nitration with nitric acid the step which comprises adding a nitrite to the sulphuric acid.

2. In the manufacture of trinitroresorcinol by the sulphonation of resorcinol with sulphuric acid and subsequent nitration with nitric acid the step which comprises adding sodium nitrite to the sulphuric acid.

3. In the manufacture of trinitroresorcinol by the sulphonation of resorcinol with sulphuric acid and subsequent nitration with nitric acid the step which comprises adding substantially 2 percent sodium nitrite by weight of the resorcinol to the sulphuric acid.

4. In the manufacture of trinitroresorcinol the process which comprises adding a nitrite to sulphuric acid at an elevated temperature, gradually adding resorcinol thereto at an elevated temperature, heating the mixture, cooling it and adding nitric acid thereto.

5. In the manufacture of trinitroresorcinol the process which comprises adding sodium nitrite to sulphuric acid at an elevated temperature, gradually adding resorcinol thereto at an elevated temperature, heating the mixture, cooling it, and adding nitric acid thereto.

JOHN W. WILKINSON.